US012736749B2

(12) United States Patent
Lo et al.

(10) Patent No.: US 12,736,749 B2
(45) Date of Patent: Sep. 15, 2026

(54) SILICON PHOTONIC PLATFORM, METHOD FOR FORMING COMPOSITE PLATFORM AND METHOD FOR FORMING SILICON PHOTONIC PLATFORM

(71) Applicant: Vanguard International Semiconductor Corporation, Hsinchu (TW)

(72) Inventors: Ming-Cheng Lo, New Taipei City (TW); Shih-Chang Huang, Hsinchu City (TW); Jui-Chun Chang, Hsinchu City (TW); Wu-Hsi Lu, Hsinchu City (TW); Yu-Che Tsai, Hsinchu City (TW); Shih-Hao Liu, Taoyuan City (TW); Yen-Shih Ho, Taoyuan City (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 315 days.

(21) Appl. No.: 18/382,064

(22) Filed: Oct. 20, 2023

(65) Prior Publication Data

US 2025/0130368 A1 Apr. 24, 2025

(51) Int. Cl.
*G02B 6/136* (2006.01)
*G02B 6/12* (2006.01)

(52) U.S. Cl.
CPC .... *G02B 6/136* (2013.01); *G02B 2006/12097* (2013.01)

(58) Field of Classification Search
CPC ...................... G02B 6/136; G02B 2006/12097
See application file for complete search history.

(56) References Cited

U.S. PATENT DOCUMENTS

| | | | | |
|---|---|---|---|---|
| 6,376,272 | B1 * | 4/2002 | Bond | G02B 6/136 372/45.01 |
| 7,174,080 | B2 * | 2/2007 | Walker | G02B 6/14 385/132 |
| 8,557,721 | B2 | 10/2013 | Timans | |
| 9,817,185 | B2 * | 11/2017 | Sacher | G02B 6/122 |
| 11,960,154 | B2 * | 4/2024 | Bovington | G02F 1/0147 |
| 2003/0000919 | A1 * | 1/2003 | Velebir, Jr. | G02B 6/136 216/99 |
| 2004/0096175 | A1 | 5/2004 | Tolstikhin | |

(Continued)

FOREIGN PATENT DOCUMENTS

| | | |
|---|---|---|
| CN | 104737317 B | 11/2017 |
| TW | 202230468 A | 8/2022 |

*Primary Examiner* — Rhonda S Peace
(74) *Attorney, Agent, or Firm* — Winston Hsu

(57) ABSTRACT

A silicon photonic platform includes a composite substrate with a first photonic platform layer which includes a photonic platform material. A first signal layer covers the first photonic platform layer, has a top surface, and includes the photonic platform material and a first signal material. A photonic platform spectral signal is different from the first signal material spectral signal. The second photonic platform layer has a top surface, covers at least a portion of the top surface of the first signal, and includes the photonic platform material. The second photonic platform layer includes at least one ridge structure, and forms a silicon photonic platform together with the first photonic platform layer.

18 Claims, 8 Drawing Sheets

(56) References Cited

U.S. PATENT DOCUMENTS

| | | | | |
|---|---|---|---|---|
| 2014/0212104 | A1 * | 7/2014 | Cho | G02B 6/136<br>216/11 |
| 2017/0254951 | A1 * | 9/2017 | Dumais | G02B 6/12002 |
| 2018/0356593 | A1 * | 12/2018 | Baehr-Jones | G02B 6/136 |
| 2021/0151956 | A1 | 5/2021 | Raring | |
| 2021/0215875 | A1 * | 7/2021 | Koch | G02B 6/136 |
| 2021/0247570 | A1 * | 8/2021 | Zhang | G02F 1/0027 |
| 2024/0337870 | A1 * | 10/2024 | Patel | G02F 1/0316 |
| 2025/0130368 | A1 * | 4/2025 | Lo | G02B 6/136 |

* cited by examiner

SILICON PHOTONIC PLATFORM, METHOD FOR FORMING COMPOSITE PLATFORM AND METHOD FOR FORMING SILICON PHOTONIC PLATFORM

BACKGROUND OF THE INVENTION

1. Field of the Invention

The present disclosure relates to a silicon photonic platform, a method of manufacturing a composite platform, and a method of using the composite platform to manufacture a silicon photonic platform. In particular, the present disclosure relates to a method of manufacturing a silicon photonic platform by using a signal layer to control the accuracy of the etching depth.

2. Description of the Prior Art

The silicon photonic platform is a waveguide structure which may directionally guide the transmission of electromagnetic waves. Such waveguide structure requires a highly precise dimensional structure. For the current complementary metal oxide semiconductor (CMOS) manufacturing methods, the fluctuation value of the etching depth of the etching process is too large, for example, about 30 nanometers, to meet the demands of high-precision dimensional requirements of the current waveguide structures.

SUMMARY OF THE INVENTION

The present disclosure proposes a silicon photonic platform, a method of manufacturing a composite platform, and a method of using the composite platform to manufacture a silicon photonic platform. In the process of manufacturing a silicon photonic platform, by using a signal layer to control the accuracy of the etching depth, a higher accuracy of the etching depth may be obtained than by using a conventional etching stop layer. Higher accuracy of etching depth may reduce the geometric size error of the silicon photonic platform, which is beneficial to the application of the silicon photonic platform in waveguides for directional guidance of electromagnetic waves.

According to one embodiment of the present disclosure, a silicon photonic platform is provided. The silicon photonic platform includes a composite substrate, a first signal layer, a third photonic platform layer, a second signal layer and a second photonic platform layer. The composite substrate has a first photonic platform layer. The first photonic platform layer includes a photonic platform material. The first signal layer covers the first photonic platform layer, has a top surface and includes the photonic platform material and a first signal material. A photonic platform spectral signal of the photonic platform material is different from a first spectral signal of the first signal material. The second photonic platform layer has a top surface, covers at least a portion of the top surface of the first signal layer and includes the photonic platform material. The second photonic platform layer includes at least one ridge structure and forms the silicon photonic platform together with the first photonic platform layer.

According to another embodiment of the present disclosure, a method for forming a composite platform is provided and includes the following steps: providing a composite substrate with a first photonic platform layer which includes a photonic platform material; forming a first signal layer covering the first photonic platform layer and including the photonic platform material and a first signal material, wherein a photonic platform spectral signal of the photonic platform material is different from a first spectral signal of the first signal material; forming a third photonic platform layer covering the first signal layer and including the photonic platform material; forming a second signal layer covering the third photonic platform layer and including the photonic platform material and a second signal material, wherein the photonic platform spectral signal of the photonic platform material is different from a second spectral signal of the second signal material; and forming a second photonic platform layer covering the second signal layer and including the photonic platform material, so that the composite substrate, the first signal layer, the third photonic platform layer, the second signal layer, and the second photonic platform layer together form the composite platform.

According to another embodiment of the present disclosure, a method for forming a silicon photonic platform is provided and includes the following steps: providing a composite platform which is formed by the method described above; and performing a grating etching process on the second photonic platform layer so that the second photonic platform layer forms a plurality of ridge structures. The plurality of ridge structures, the third photonic platform layer and the first photonic platform layer together form a grating silicon photonic platform. The grating etching process is stopped when the second spectral signal is added to the photonic platform spectral signal which is detected during performing the grating etching process.

According to another embodiment of the present disclosure, a method for forming a silicon photonic platform is provided and includes the following steps: providing a composite platform which is formed by the method described above; and performing a rib etching process on the second photonic platform layer and on the third photonic platform layer so that the second photonic platform layer, the second signal layer and the third photonic platform layer together form a single ridge structure. The single ridge structure forms a rib silicon photonic platform together with the first photonic platform layer. The rib etching process is stopped when the first spectral signal is added to the photonic platform spectral signal which is detected during performing the rib etching process.

These and other objectives of the present invention will no doubt become obvious to those of ordinary skill in the art after reading the following detailed description of the preferred embodiment that is illustrated in the various FIG.s and drawings.

BRIEF DESCRIPTION OF THE DRAWINGS

In order to make the following descriptions understood more easily, please refer to the drawings and to the accompanied detailed descriptions together when referring to this disclosure. Through the specific embodiments and with reference to the corresponding drawings, the specific embodiments of the present disclosure are explained in details, and the working principles of the specific embodiments of the present disclosure are elaborated. In addition, features in the drawings may not be drawn to actual scale because of clarity, and therefore the dimensions of some features in some drawings may be intentionally exaggerated or reduced.

DETAILED DESCRIPTION

Figure 1:
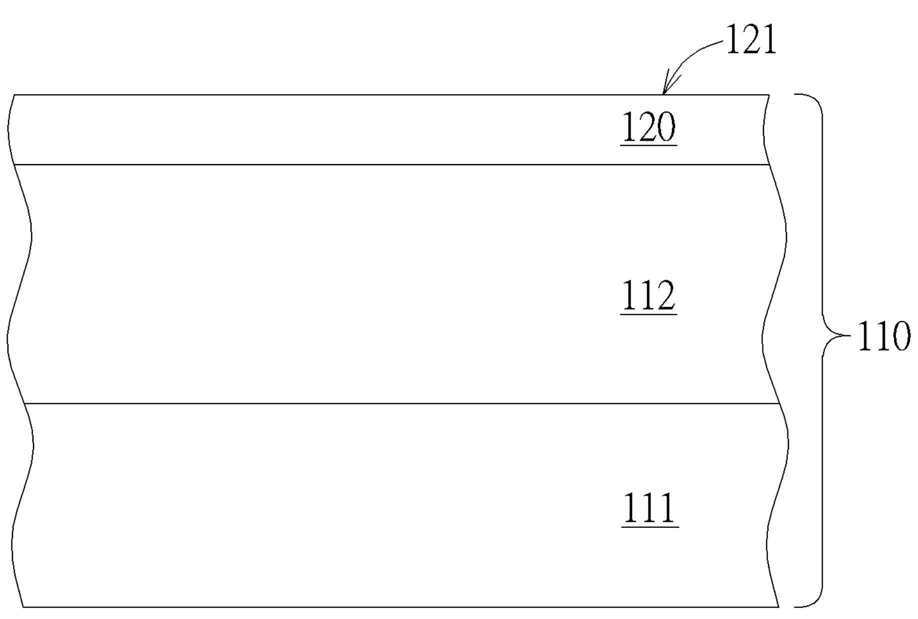
FIG. 1 and FIG. 2 illustrate schematic cross-sectional views of some stages of a manufacturing method of a composite platform according to an embodiment of the present disclosure.

The present disclosure provides several different embodiments which may be used to enable different features of the present disclosure. To simplify the explanation, some examples of specific components and arrangements are also described in this disclosure. These examples are provided for illustrative purposes only and are not intended to be limitations in any way. For example, the following description of "the first feature is formed on or above the second feature" may mean "the first feature is in direct contact with the second feature" or "there are other features between the features so that the first feature and the second feature are not in direct contact with each other". Additionally, various embodiments in the present disclosure may use repeated reference symbols and/or wordings. These repeated reference symbols and wordings are used to make the description more concise and clear, but are not used to indicate the correlation between different embodiments and/or configurations.

In addition, for the space-related wordings mentioned in this disclosure, for example: "under", "low", "beneath", "above", "on", "upper", "top", "bottom" and similar words are used to describe the relative relationship between one element or feature and another (or multiple) elements or features in the drawings for the convenience of description. In addition to the orientations shown in the drawings, these spatially related terms are also used to describe possible orientations of the semiconductor device during use and operation. As a semiconductor device is oriented differently (rotated 90 degrees or other orientations), the spatially related description used to describe the orientation should be interpreted in a similar manner.

Although this disclosure uses terms such as first, second, third, etc. to describe various elements, components, regions, layers, and/or sections, it should be understood that these elements, components, regions, layers, and/or sections should not be limited by these terms. These terms are only used to distinguish one element, component, region, layer, and/or section from another element, component, region, layer, and/or section, and they neither imply or represent the element with a previous serial number, nor represent the order of arrangement of one component with another component, or the order of the manufacturing method. Therefore, a first element, component, region, layer, or section used below may also be termed a second element, component, region, layer, or section without departing from the scope of the specific embodiments of the present disclosure.

Terms "about" or "substantially" used in this disclosure generally mean within 20%, preferably within 10%, and more preferably within 5% of a given value of range, or within 3%, or within 2%, or within 1%, or within 0.5%. It should be noted that the quantities provided in the specification are approximate quantities, that is, even without specifically stating "approximately" or "substantially", the meaning of "approximately" or "substantially" may still be implied.

The terms "couple", "coupling" and "electrical connection" mentioned in this disclosure include any direct and indirect electrical connection means. For example, if a first component is coupled to a second component, it means that the first component can be directly electrically connected to the second component, or indirectly electrically connected to the second component via other devices or connections.

Although the invention of the present disclosure is described below through specific embodiments, the inventive principles of the present disclosure can also be applied to other embodiments. In addition, in order not to obscure the spirit of the present disclosure, specific details are omitted, and these omitted details fall within the scope of knowledge of those with ordinary skill in the art.

Figure 2:
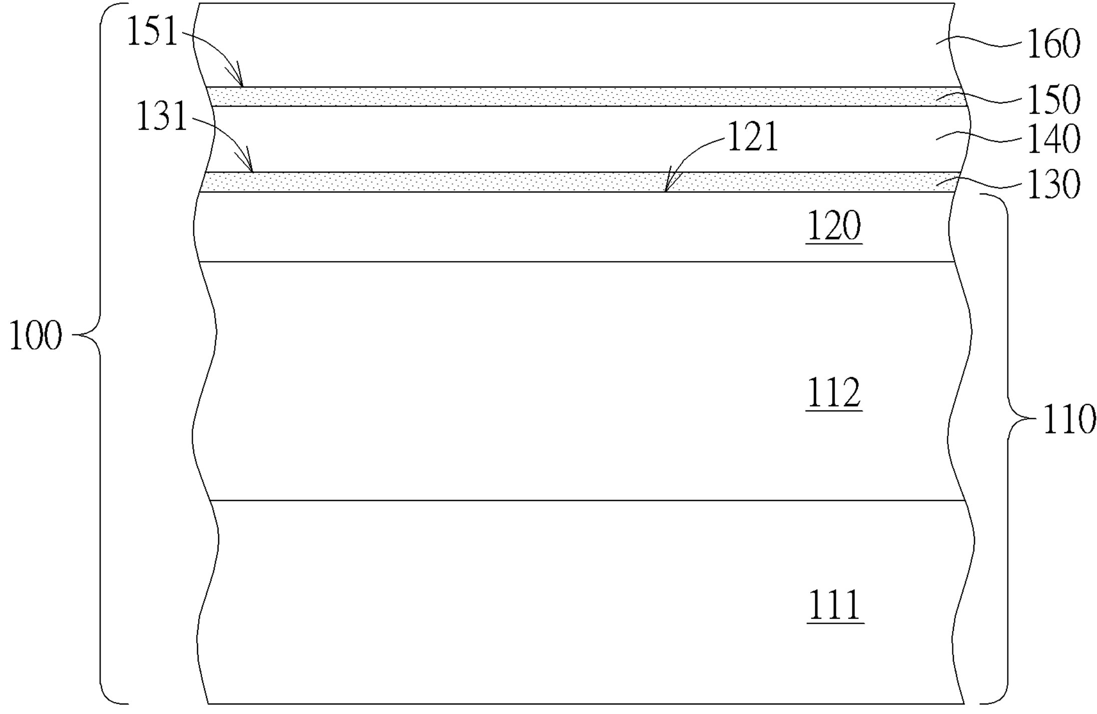

FIG. 1 to FIG. 2 illustrate schematic cross-sectional views of some stages of a manufacturing method of a composite platform according to an embodiment of the present disclosure. The composite platform manufactured in this embodiment may be used to manufacture a silicon photonic platform for waveguides. As shown in FIG. 1, in step S101, first a substrate 110 is provided. The substrate 110 may be, for example, a composite substrate, such as a silicon-on-insulator (SOI) substrate. For example, the substrate 110 may be composed of a substrate bottom layer 111, a substrate buried layer 112 and a first photonic platform layer 120. The substrate bottom layer 111 may include an elemental material or a compound material of a semiconductor element. The elemental material of the semiconductor element may be, for example, single crystal silicon. The compound material of the semiconductor element may be, for example, silicon carbide or gallium nitride. Elemental materials and compound materials may come from wafers, and the wafers are obtained by performing crystal growth methods. The crystal growth methods include, for example, the floating zone method, laser heated pedestal growth, and Czochralski method, etc. The substrate buried layer 112 may include an insulating material. The insulating material may be, for example, a buried oxide (BOX), which is stacked on the substrate bottom layer 111. The first photonic platform layer 120 entirely covers the top surface of the substrate buried layer 112 and may be disposed on the substrate buried layer 112 through a wafer bonding process or a deposition process. The first photonic platform layer 120 may include a photonic platform material. The photonic platform material includes an elemental material or a compound material of semiconductor elements. The elemental material of the semiconductor element may be, for example, single crystal silicon, and the compound material may be, for example, a silicon nitride layer. For example, an epitaxial growth process may be used to form a single crystal silicon epitaxial layer. The compound material may be formed by, for example, chemical vapor deposition (CVD), plasma-enhanced chemical vapor deposition (PECVD), or atomic layer deposition (ALD). The advantages of the epitaxial growth process may be used to precisely control a specific thickness of the first photonic platform layer 120, for example, about 90 nanometers. The first photonic platform layer 120 has an exposed top surface 121 of the first photonic platform layer 120.

Then, in FIG. 2, a first signal layer 130 is formed on the top surface 121 of the first photonic platform layer 120. The detailed steps of forming the composite platform 100 in FIG. 2 are described as follows. The first signal layer 130 entirely covers the top surface 121 of the first photonic platform layer 120 and includes a first signal material, or further includes the photonic platform material. The thickness of the first signal layer 130 may be less than 1/10 of the wavelength of the guided electromagnetic wave, so that the first signal layer 130 does not substantially interfere with the transmission of the electromagnetic waves. Alternatively, the thickness of the first signal layer 130 is less than 1/10 of the thickness of the first photonic platform layer 120. For example, the thickness of the first signal layer 130 may be about 10 nanometers, or the thickness of the first signal layer 130 may be about 5 nanometers, or the thickness of the first signal layer 130 may be about 3 nanometers. According to some embodiments of the present disclosure, the ratio of the thickness of the first signal layer 130 to the thickness of the first photonic platform layer 120 may be 0.05 to 0.1. A smaller thickness of the first signal layer 130 is beneficial to reducing the influence of the first signal layer 130 on the overall composite platform 100.

In one embodiment, the first signal material and the photonic platform material are not exactly the same, so that the photonic platform spectral signal of the photonic platform material is different from the first spectral signal of the first signal material. For example, the first signal layer 130 is a germanium silicide epitaxial layer formed of the first signal material germanium and the photonic platform material silicon, or, for example, the silicon used as the photonic platform material is doped with arsenic, phosphorus or boron as the dopants of the first signal materials. When plasma etching is subsequently carried out on the first signal material and on the photonic platform material, the first signal material and the photonic platform material may respectively emit different spectral signals, and a detector may detect the signals and determine the etching depth. At this time, the first signal layer 130 has an exposed top surface 131. The epitaxial growth process may be used to form the germanium silicide epitaxial layer, or after the epitaxial growth of silicon, a doping process may be used to dope the epitaxial silicon layer with the dopant which serves as the first signal material. The advantages of the epitaxial growth process may also be used to precisely control the thickness of the first signal layer 130 so that the thickness of the first photonic platform layer 120 and of the first signal layer 130 in common has a specific stacking thickness, for example, about 90 nanometers.

In FIG. 2, on the top surface 131 of the first signal layer 130, an epitaxial growth process or chemical vapor deposition method, plasma enhanced chemical vapor deposition method, or atomic layer deposition method is used to form the third photonic platform layer 140. The third photonic platform layer 140 entirely covers the top surface 131 of the first signal layer 130 and includes a photonic platform material. Please refer to the above for the details of photonic platform materials. The advantages of the epitaxial growth process may be used to precisely control the specific thickness of the third photonic platform layer 140, for example, about 60 nanometers. Next, a second signal layer 150 is formed on the third photonic platform layer 140. The second signal layer 150 entirely covers the third photonic platform layer 140 and includes a second signal material, or further includes the photonic platform material. The thickness of the second signal layer 150 may be less than 1/10 of the guided wavelength of the electromagnetic waves. For example, the thickness of the second signal layer 150 may be less than 10 nanometers, so that the second signal layer 150 does not substantially interfere with the transmission of electromagnetic waves. Alternatively, the thickness of the second signal layer 150 is less than 1/10 of the thickness of the third photonic platform layer 140. For example, the thickness of the second signal layer 150 may be about 6 nanometers, or the thickness of the second signal layer 150 may be about 5 nanometers, or the thickness of the second signal layer 150 may be about 3 nanometers. According to some embodiments of the present disclosure, the ratio of the thicknesses of the second signal layer 150 to the thicknesses of the first photonic platform layer 120 may be 0.05 to 0.1. A smaller thickness of the second signal layer 150 is beneficial to reducing the influence of the second signal layer 150 on the overall composite platform 100.

In one embodiment, the second signal material and the photonic platform material are not exactly the same, so that the photonic platform spectral signal of the photonic platform material is different from the second spectral signal of the second signal material. The second signal material may be similar to the aforementioned first signal material. At this time, the second signal layer 150 has an exposed top surface 151. The epitaxial growth process may be used to form the germanium silicide epitaxial layer, or after the epitaxial growth of silicon, a doping process may be used to dope the epitaxial silicon layer with the dopant which serves as the second signal material. The advantages of the epitaxial growth process may also be used to precisely control the thickness of the second signal layer 150 so that the thickness of the third photonic platform layer 140 and the thickness of the second signal layer 150 in total has a specific stacking thickness, for example, about 60 nanometers. In another embodiment, the composition of the second signal layer 150 and the composition of the first signal layer 130 may be the same or different.

Next, as shown in FIG. 2, on the top surface 151 of the second signal layer 150, an epitaxial growth process or a chemical vapor deposition method, a plasma enhanced chemical vapor deposition method, or an atomic layer deposition method is used to form a second photonic platform layer 160. The second photonic platform layer 160 entirely covers the top surface 151 of the second signal layer 150 and includes a photonic platform material. Please refer to the above for the details of photonic platform materials. The advantages of the epitaxial growth process may be used to precisely control a specific thickness of the second photonic platform layer 160, for example, about 70 nanometers. Therefore, after the aforementioned steps, a composite platform 100 formed by the stacking of the substrate 110, the first signal layer 130, the third photonic platform layer 140, the second signal layer 150 and the second photonic platform layer 160 and provided by the present disclosure is obtained. In one embodiment, the first photonic platform layer 120, the third photonic platform layer 140 and the second photonic platform layer 160 may be composed of photonic platform materials of the same properties, for example, composed of elemental materials of semiconductor elements, or composed of compound materials.

According to an embodiment, the first photonic platform layer 120, the third photonic platform layer 140 and the second photonic platform layer 160 are not limited to epitaxial materials, and may be amorphous or polycrystalline materials, such as silicon nitride. Therefore, the first signal layer 130 and the second signal layer 150 may be amorphous materials or polycrystalline materials with dopants, such as silicon nitride with dopants such as arsenic, phosphorus or boron, but the present disclosure is not limited thereto.

Figure 3:
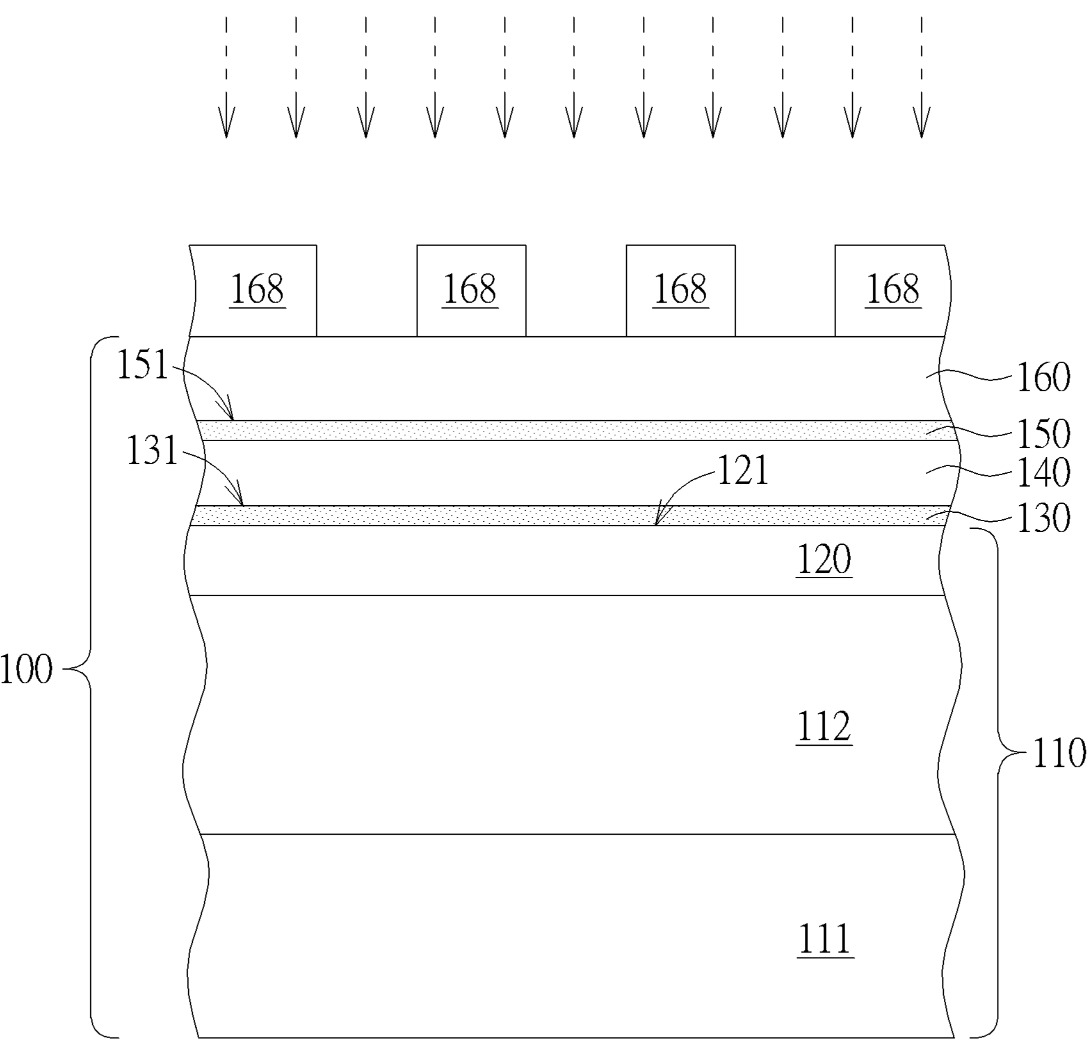
FIG. 3 and FIG. 4 are schematic cross-sectional views of some stages of a manufacturing method of a grating silicon photonic platform according to an embodiment of the present disclosure.
Figure 4:
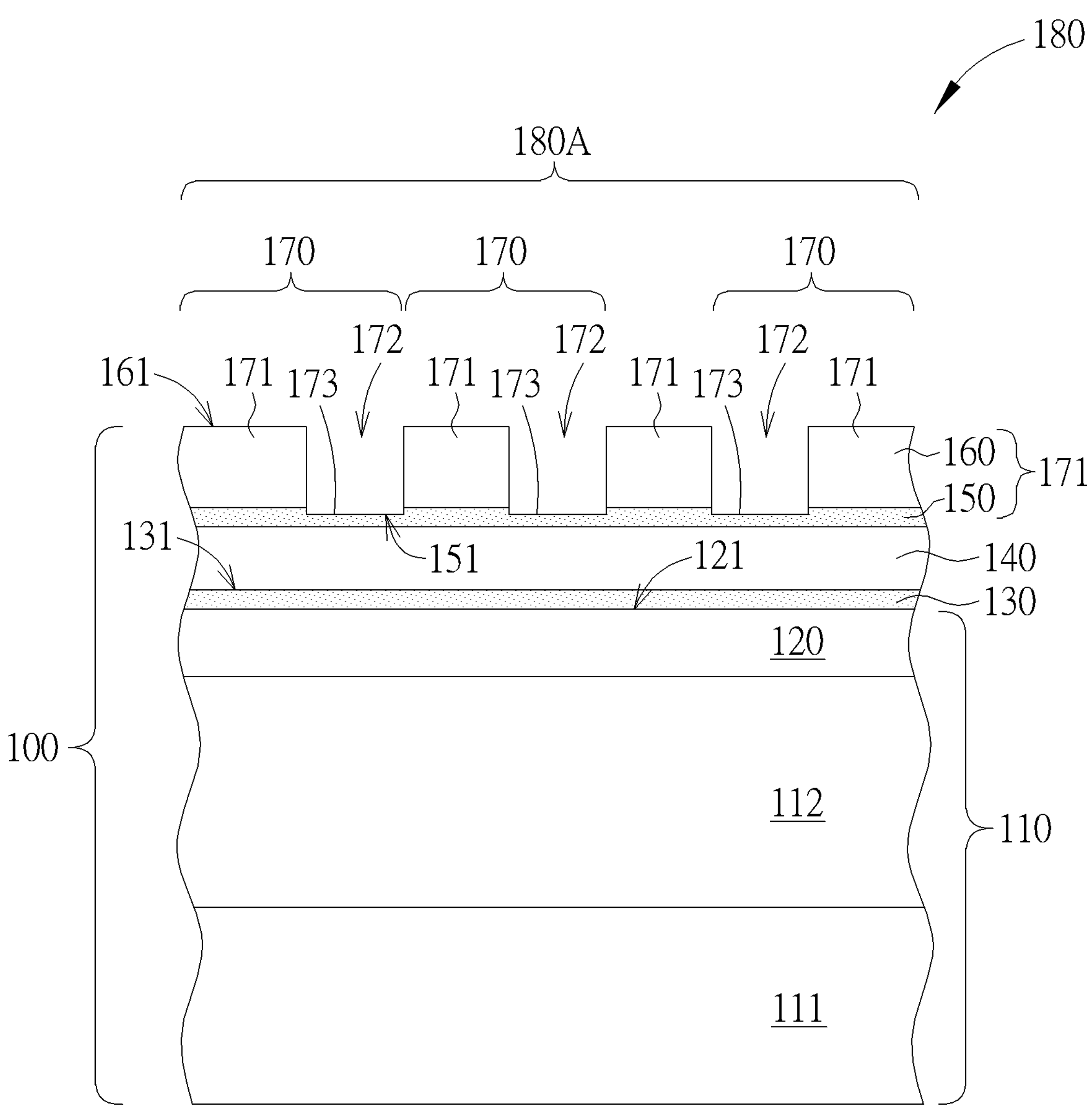

The silicon photonic platform disclosed in the present disclosure may have multiple examples, such as a grating silicon photonic platform or a rib silicon photonic platform. The composite platform 100 manufactured in the foregoing embodiments may be used to manufacture various silicon photonic platforms in the embodiments. FIG. 3 to FIG. 4 are schematic cross-sectional views of some stages of a manufacturing method of a grating silicon photonic platform according to an embodiment of the present disclosure.

As shown in FIG. 3, a composite platform 100 is first provided, for example, a composite platform 100 formed of a substrate 110, a first signal layer 130, a third photonic platform layer 140, a second signal layer 150 and a second photonic platform layer 160 which stack together. Please refer to the above description for details of each layer in the composite platform 100 and they are not elaborated here again.

Next, please refer to FIG. 3 and FIG. 4 at the same time, an etching mask with a predetermined pattern, such as a grating etching mask 168, is formed on the composite platform 100, and an appropriate dry etching process, for example, a grating etching process, which is an etching processes uses to produce a grating structure, is carried out on the second photonic platform layer 160. After the grating etching process is completed, the grating etching mask 168 is removed, and at least one ridge structure 170 made of the second photonic platform layer 160 by etching may be obtained, for example, a plurality of ridge structures 170 formed by etching the second photonic platform layer 160 so that the second photonic platform layer 160 becomes a grating structure 180A, as shown in FIG. 4. At least one ridge structure 170 may be composed of staggered ridges 171 and ridge valleys 172. A ridge 171 is composed of the stacked second photonic platform layer 160 and a portion of the second signal layer 150. The bottom of the ridge valley 172 is the valley bottom 173, and a valley bottom 173 exposes a portion of the top surface 151 of the second signal layer 150. In one embodiment, the substrate 110, the first photonic platform layer 120, the first signal layer 130, the third photonic platform layer 140, the second signal layer 150 and the plurality of ridge structures 170 together form the grating silicon photonic platform 180 of the present disclosure.

During the grating etching process, the etching product at this time is essentially nothing but the photonic platform material, such as silicon because the topmost second photonic platform layer 160 is etched first. If the spectrum of the etching product is detected during the grating etching process, only the photonic platform spectral signal of the photonic platform material is obtained. When the grating etching process continues till the second signal layer 150 originally covered by the second photonic platform layer 160 is exposed, the etching products at this time suddenly include new substances other than the photonic platform material, such as germanium, or arsenic, phosphorus or boron which are used as the dopants of the second signal material. Therefore, the spectral signals of the etching products in the grating etching process suddenly have new signals other than the spectral signal of the photonic platform, for example the second spectral signals such as germanium, arsenic, phosphorus or boron. Therefore, in one embodiment, the second spectral signal may be used as a stop signal for the grating etching process. For example, the etching product spectral signal in the grating etching process is continuously detected until a second spectral signal is added to the photonic platform spectral signal of the etching product spectral signal, and the grating etching process is stopped. That is to say, the second signal layer 150 may be used as a stop signal layer in the grating etching process. According to an embodiment, the etching rate of the second signal layer 150 is less than the etching rate of the second photonic platform layer 160, for example, the etching rate of the second signal layer 150 is less than ⅕ of the etching rate of the second photonic platform layer 160, but the present disclosure is not limited thereto.

Figure 5:
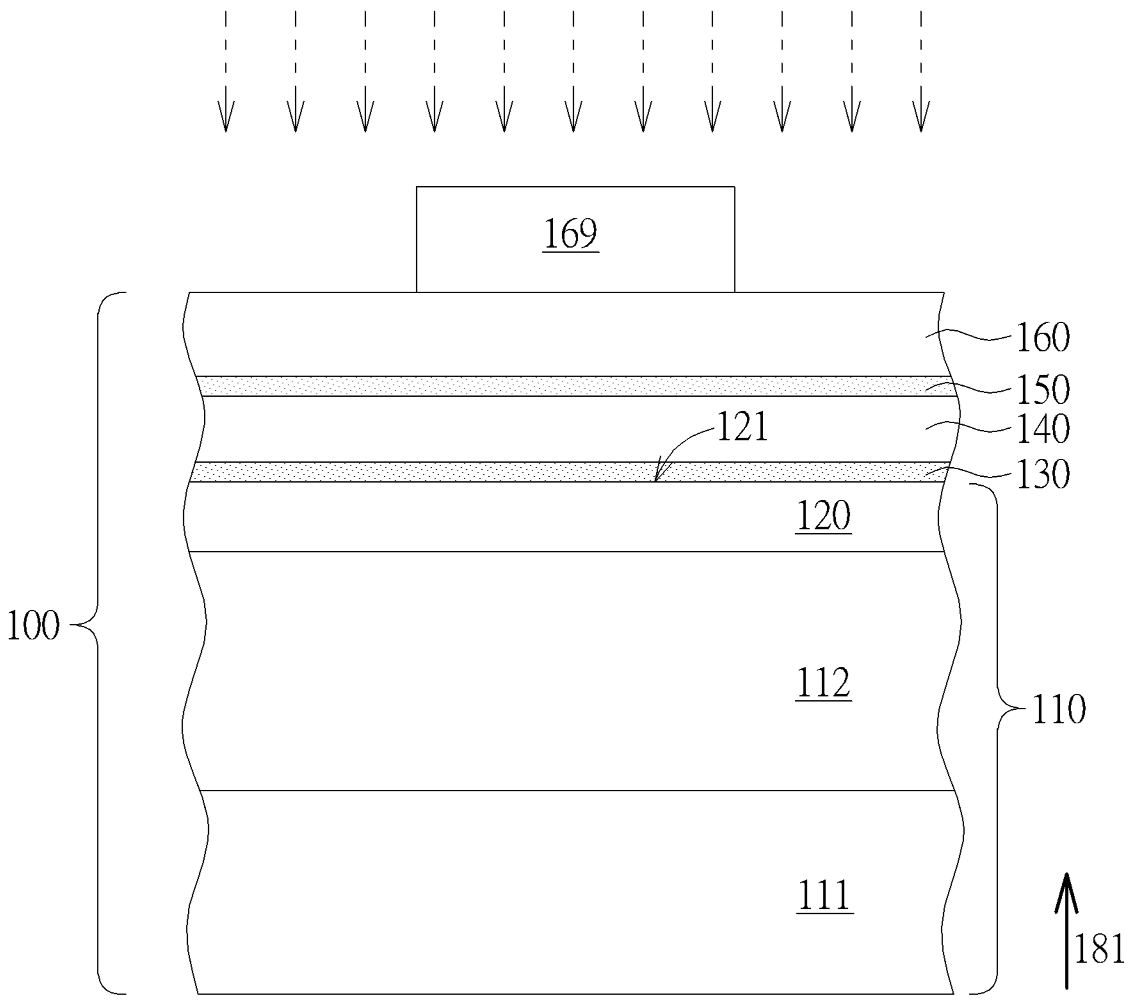
FIG. 5 and FIG. 6 are schematic cross-sectional views of some stages of a manufacturing method of a rib silicon photonic platform according to an embodiment of the present disclosure.
Figure 6:
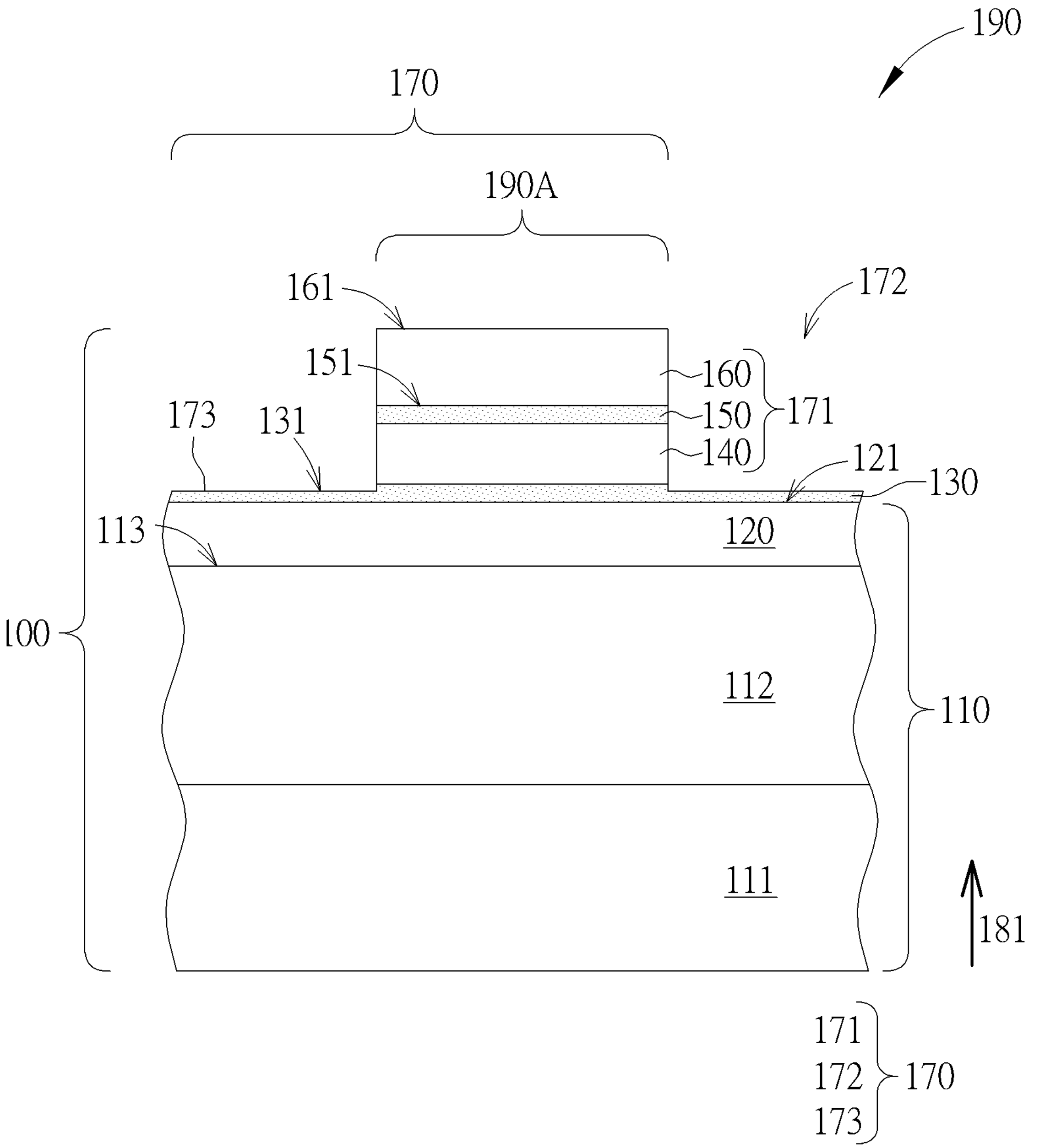

FIG. 5 to FIG. 6 are schematic cross-sectional views of some stages of a manufacturing method of a rib silicon photonic platform according to an embodiment of the present disclosure. As shown in FIG. 5, a composite platform 100 is first provided. Please refer to the above descriptions for the details of each layer in the composite platform 100 and they are not elaborated here again.

Next, please refer to FIG. 5 and FIG. 6, an etching mask with a predetermined pattern, such as a rib etching mask 169, is formed on the composite platform 100, and an appropriate dry etching process, such as a rib etching process used to produce a rib structure, is continuously carried out on the second photonic platform layer 160 and on the third photonic platform layer 140. After completing the rib etching process, the rib etching mask 169 is removed, and at least one ridge structure 170 obtained by etching the second photonic platform layer 160 and the third photonic platform layer 140 together may be obtained, for example, a single ridge structure 170 formed by etching the second photonic platform layer 160 and the third photonic platform layer 140 together, so that the second photonic platform layer 160 and the third photonic platform layer 140 together form a rib structure 190A, as shown in FIG. 6. One single ridge structure 170 may be composed of staggered ridges 171 and ridge valleys 172. The ridge 171 is composed of the stacked second photonic platform layer 160, the third photonic platform layer 140, the second signal layer 150 and a portion of the first signal layer 130. The bottom of the ridge valley 172 is the valley bottom 173, and the valley bottom 173 exposes a portion of the top surface 131 of the first signal layer 130. In one embodiment, the substrate 110, the first photonic platform layer 120 and one single ridge structure 170 together form the rib silicon photonic platform 190 of the present disclosure. According to an embodiment, after the ridge 171 is formed, another etching mask (not shown) may be further formed to cover the ridge 171 and a portion of the ridge valley 172. Then, an appropriate dry etching process is carried out to remove the first signal layer 130 and the first photonic platform layer 120 which are not covered by the etching mask to pattern the first signal layer 130 and the first photonic platform layer 120 to expose some top surface of the substrate buried layer 112.

During the rib etching process, the etching product at this time is essentially nothing but the photonic platform material, such as silicon because the third photonic platform layer 140 is etched. If the spectrum of the etching product is detected during the rib etching process, only the photonic platform spectral signal of the photonic platform material is obtained. When the rib etching process continues till the first signal layer 130 covered by the third photonic platform layer 140 is exposed, the etching products at this time suddenly has new substances other than the photonic platform material, such as germanium, or arsenic, phosphorus or boron which are used as a dopant of the first signal material. Therefore, suddenly new signals are added to the spectral signal of the etching product in the rib etching process other than the spectral signal of the photonic platform, such as the first spectral signal of germanium, arsenic, phosphorus or boron. Therefore, in one embodiment, the first spectral signal may be used as a stop signal for the rib etching process. For example, the etching product spectral signal in the rib etching process is continuously detected till a first spectral signal is added to the photonic platform spectral signal of the etching product spectral signal, and the rib etching process is stopped. That is to say, the first signal layer 130 may be used as a stop signal layer in the rib etching process.

Please note that the aforementioned stop signal layers are not the conventional etching stop layers in the relevant etching processes, because the stop signal layer here does not necessarily have the conventional etching selectivity difference of the etching stop layer in the etching process. If the corresponding etching process is not stopped immediately when a new spectral signal is detected in the spectral signal of the etching product, the fluctuation value of the vertical distance of the silicon photonic platform is jeopardized because the thickness of the first signal layer 130 or of the second signal layer 150 is too small to slow down the etching process. In other words, the stop signal layer used in the present disclosure has higher material conversion sensitivity than a conventional etching stop layer, which is beneficial to the etching depth control of the corresponding etching process, and to further obtain better etching depth control of the corresponding etching process, and very small fluctuation value in the vertical distance between layers of the silicon photonics platform.

After using the composite platform 100 manufactured in the above embodiments to carry out the manufacturing method of the silicon photonic platform, silicon photonic platforms of various structures in the present disclosure may be obtained. The refractive index of various silicon photonic platforms with different structures in the present disclosure is smaller than the refractive index of the surrounding medium (such as air), so the silicon photonic platform may be used to directionally guide electromagnetic waves. The directionally guided electromagnetic waves may be electromagnetic waves of larger wavelengths, such as infrared light. According to some embodiments of the present disclosure, the wavelength of infrared light is greater than 760 nanometers, for example, it may be infrared light of a wavelength of 1330 nanometers or a wavelength of 1550 nanometers.

Figure 7:
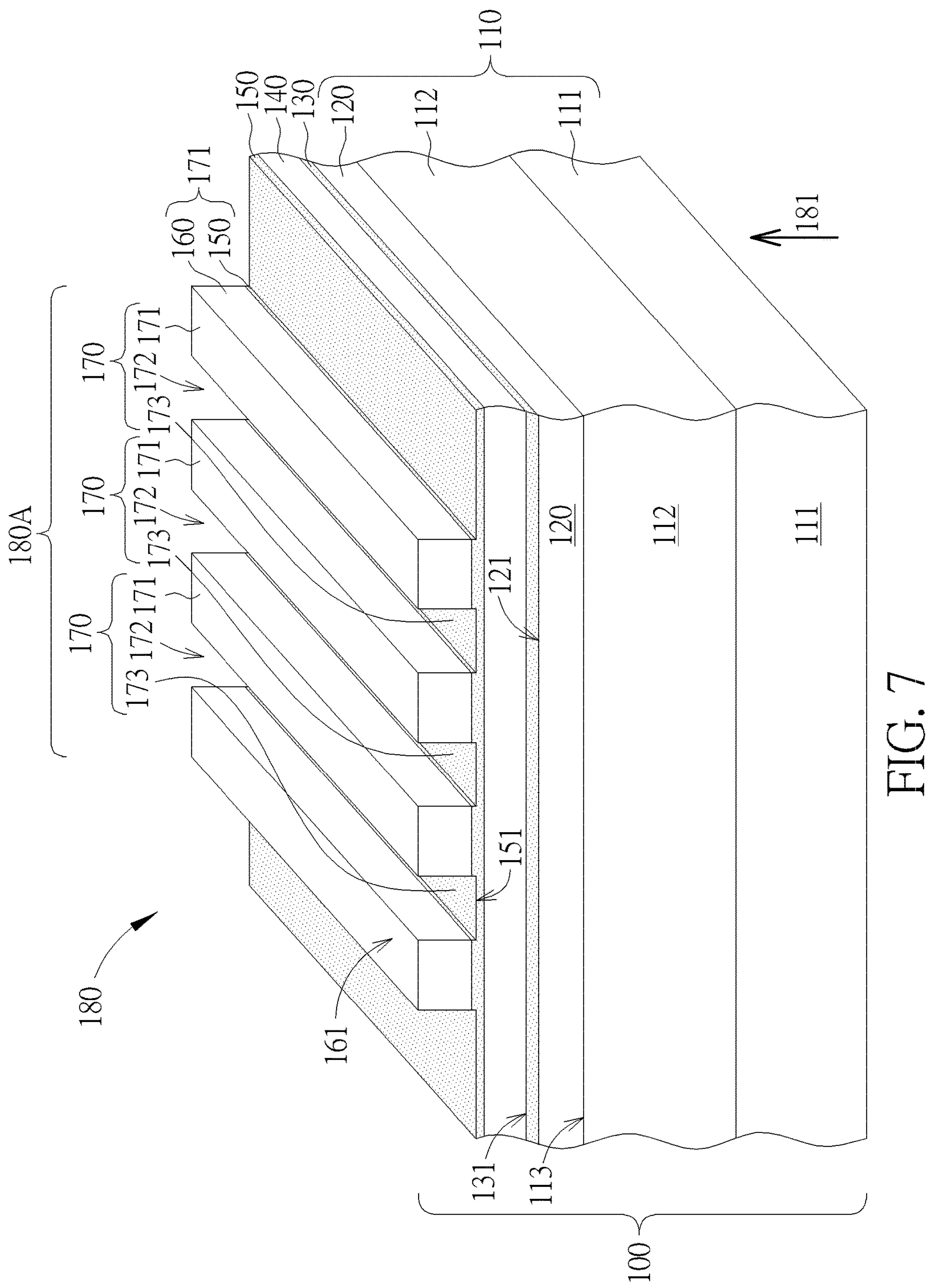
FIG. 7 is a schematic diagram of a grating silicon photonic platform according to an embodiment of the present disclosure.
Figure 8:
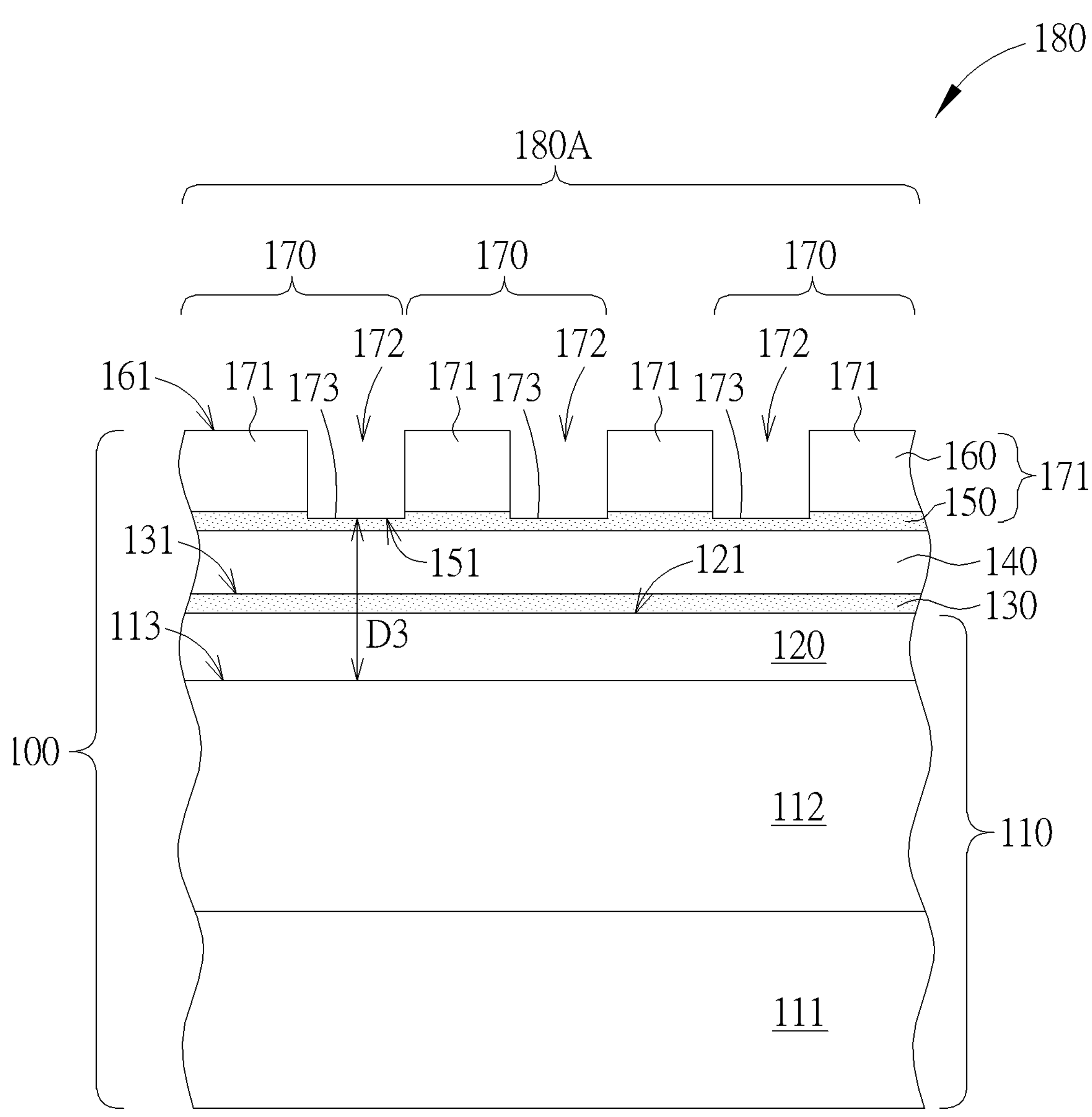
FIG. 8 is a schematic cross-sectional view of a grating silicon photonic platform according to an embodiment of the present disclosure.

FIG. 7 is a schematic diagram of a grating silicon photonic platform 180 according to an embodiment of the present disclosure. FIG. 8 is a schematic cross-sectional view of a grating silicon photonic platform 180 according to an embodiment of the present disclosure. The grating silicon photonic platform 180 sequentially includes a substrate 110, a first signal layer 130, a third photonic platform layer 140, a second signal layer 150, and a second photonic platform layer 160 with a plurality of ridge structures 170 from bottom to top according to the stacking direction 181. The plurality of ridge structures 170 makes the second photonic platform layer 160 have a grating structure 180A, and makes the silicon photonic platform shown in FIG. 7 a grating silicon photonic platform 180. Each ridge structure 170 may be composed of staggered ridges 171 and ridge valleys 172. In one embodiment, the first photonic platform layer 120 covers the substrate top surface 113 (also called top surface 113) and includes a photonic platform material. The first signal layer 130 covers the first photonic platform layer 120, has a top surface 131 of the first signal layer 130, and includes a photonic platform material and a first signal material. The photonic platform spectral signal of the photonic platform material is different from the first spectral signal of the first signal material. The third photonic platform layer 140 covers the top surface 131 of the first signal layer 130 and includes a photonic platform material. The second signal layer 150 covers the third photonic platform layer 140, has a top surface 151 of the second signal layer 150, and includes a photonic platform material and a second signal material. The photonic platform spectral signal of the photonic platform material is different from the second spectral signal of the second signal material. The second photonic platform layer 160 has a top surface 161 of the second photonic platform layer 160, at least covers a portion of the top surface 131 of the first signal layer 130, exposes a portion of top surface 151 of the second signal layer 150, and includes the photonic platform material. Please refer to the above descriptions for details of each layer in the grating silicon photonic platform 180 and they are not elaborated here again.

There is a third vertical distance D3 between the substrate top surface 113 and the top surface 151 of the second signal layer 150 along the stacking direction 181. The third vertical distance D3 along the stacking direction 181 between the substrate top surface 113 and the top surface 151 of the second signal layer 150 may not be a fixed value, so it may have a third maximum vertical distance value DM3 and a third minimum vertical distance value Dm3. In one embodiment, due to the excellent etching depth uniformity of the grating etching process, a third fluctuation value of the third vertical distance D3 is not more than 2 nanometers, or less than 2 nanometers. The calculation method of the third fluctuation value may be, (third maximum vertical distance value DM3−third minimum vertical distance value Dm3)≤2 nanometers.

During the operation of the grating silicon photonic platform 180, electromagnetic waves may be laterally transmitted to go underneath the ridge structure 170 from one end of the first photonic platform layer 120, the first signal layer 130, the third photonic platform layer 140 and the second signal layer 150. Since the ridge structure 170 has a predetermined pitch and width, it may interact with the electromagnetic wave of a selected wavelength, so that the electromagnetic wave of the selected wavelength is emitted from the grating silicon photonic platform 180 and detected by an external detector. Therefore, the grating silicon photonic platform 180 may be used to transmit electromagnetic waves of selected wavelengths.

Figure 9:
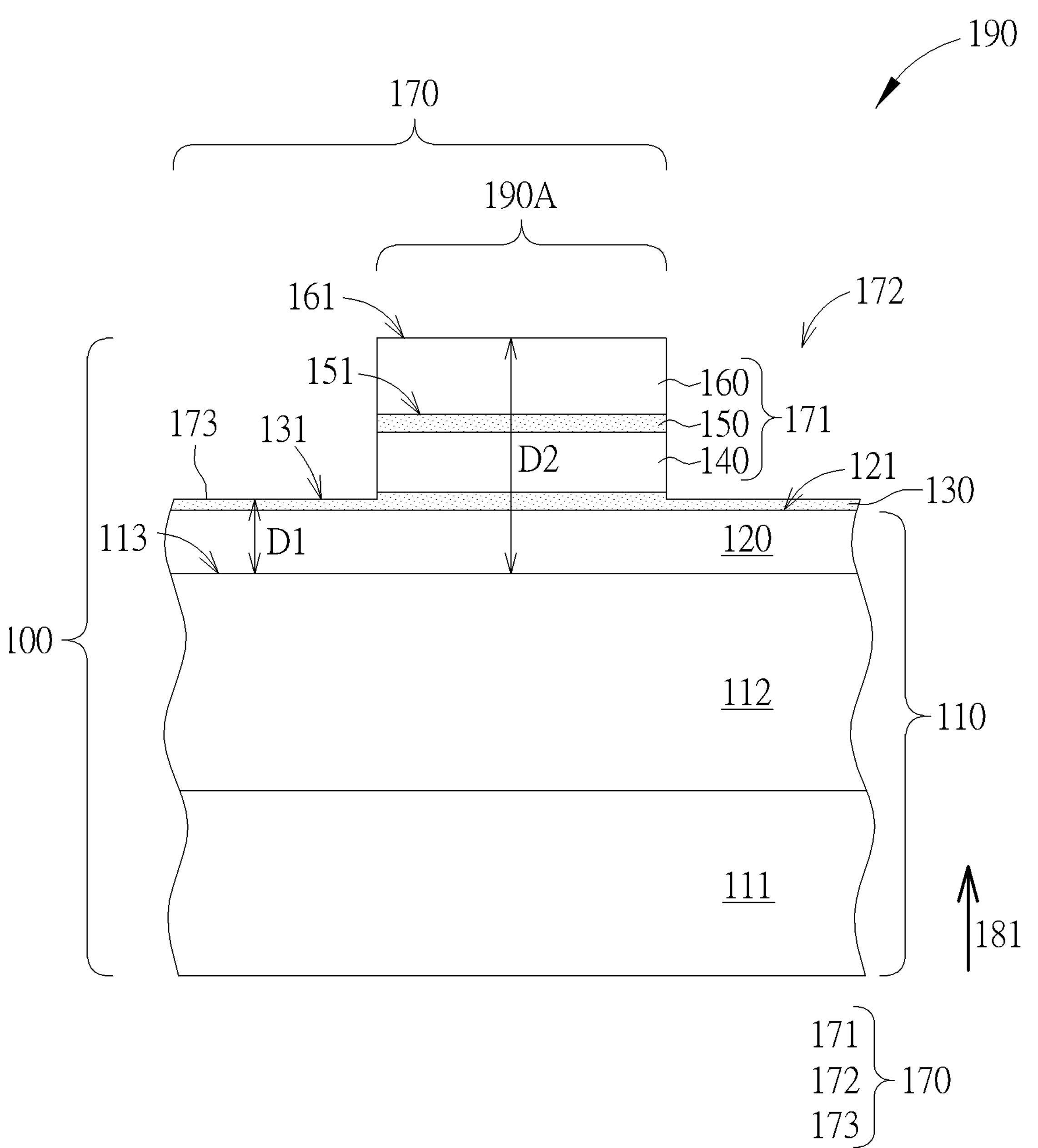
FIG. 9 is a schematic cross-sectional view of a rib silicon photonic platform according to an embodiment of the present disclosure.

FIG. 9 is a schematic cross-sectional view of a rib silicon photonic platform 190 according to an embodiment of the present disclosure. The rib silicon photonic platform 190 sequentially includes a substrate 110, a first signal layer 130, a third photonic platform layer 140 with a single ridge structure 170, a second signal layer 150, and a second photonic platform layer 160 from bottom to top according to the stacking direction 181. The single ridge structure 170 makes the second photonic platform layer 160 have a rib structure 190A, and makes the silicon photonic platform shown in FIG. 9 a rib silicon photonic platform 190. A single ridge structure 170 may be composed of staggered ridges 171 and ridge valleys 172. In one embodiment, the first photonic platform layer 120 covers the substrate top surface 113 and includes a photonic platform material. The first signal layer 130 covers the first photonic platform layer 120 and has a first signal layer top surface 131. The third photonic platform layer 140 covers the top surface 131 of the first signal layer 130 and includes a photonic platform material. The second signal layer 150 covers the third photonic platform layer 140, has a top surface 151, and includes a photonic platform material and a second signal material. The photonic platform spectral signal of the photonic platform material is different from the second spectral signal of the second signal material. The second photonic platform layer 160 has a top surface 161 of the second photonic platform layer 160, covers at least a portion of top surface 151 of the second signal layer 150, exposes a portion of the top surface 131 of the first signal layer 130, and includes a photonic platform material. Please refer to the above descriptions for the details of each layer in the rib silicon photonic platform 190 and they are not elaborated here again.

There is a first vertical distance D1 between the substrate top surface 113 and the top surface 131 of the first signal layer 130 along the stacking direction 181. The first vertical distance D1 along the stacking direction 181 between the substrate top surface 113 and the top surface 131 of the first signal layer 130 may not be a fixed value, so it may have a first maximum vertical distance value DM1 and a first minimum vertical distance value Dm1. In one embodiment, due to the excellent etching depth uniformity of the rib etching process, the first fluctuation value of the first vertical distance D1 is not more than 2 nanometers, or less than 2 nanometers. The calculation method of the first fluctuation value may be: (first maximum vertical distance value DM1−first minimum vertical distance value Dm1)≤2 nanometers.

There is a second vertical distance D2 between the substrate top surface 113 and the top surface 161 of the second photonic platform layer 160 along the stacking direction 181. The second vertical distance D2 along the stacking direction 181 between the substrate top surface 113 and the top surface 161 of the second photonic platform layer 160 may not be a fixed value, so it may have a second maximum vertical distance value DM2 and a second minimum vertical distance value Dm2. In one embodiment, due to the excellent etching depth uniformity of the rib etching process, the second fluctuation value of the second vertical distance D2 is not more than 2 nanometers, or less than 2 nanometers. The calculation method of the second fluctuation value may be: (second maximum vertical distance value DM2−second minimum vertical distance value Dm2)≤2 nanometers.

In the manufacturing method of the composite platform in the present disclosure and in the method of using the composite platform to manufacture a silicon photonic platform, the composite platform includes a signal layer for controlling the etching depth, thereby obtaining higher etching depth accuracy than by the etching stop layer in the conventional etching stop layer. Because the geometric dimensions of the silicon photonic platform which is manufactured by using this manufacturing method are accurately established, the fluctuation values of the vertical distances are reduced, which is beneficial to the application of the silicon photonic platform in waveguides for directional guidance of electromagnetic waves.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A silicon photonic platform, comprising:

a composite substrate comprising a substrate top surface and a first photonic platform layer, the first photonic platform layer comprising a photonic platform material;

a first signal layer covering the first photonic platform layer, having a top surface, and comprising the photonic platform material and a first signal material, wherein a photonic platform spectral signal of the photonic platform material is different from a first spectral signal of the first signal material; and a second photonic platform layer having a top surface, at least covering a portion of the top surface of the first signal layer and exposing a portion of the top surface of the first signal layer, and comprising the photonic platform material, wherein the second photonic platform layer comprises at least one ridge structure, and the second photonic platform layer forms the silicon photonic platform together with the first photonic platform layer, a third photonic platform layer covering the top surface of the first signal layer and comprising the photonic platform material; and a second signal layer covering the third photonic platform layer, having a top surface, and comprising the photonic platform material and a second signal material, wherein the photonic platform spectral signal of the photonic platform material is different from a second spectral signal of the second signal material, wherein the portion of the top surface of the first signal layer exposed from the second photonic platform layer is lower than the portion of the top surface of the first 20 signal layer covered by the second photonic platform layer.

2. The silicon photonic platform of claim 1, wherein the second photonic platform layer comprises one single ridge structure, so that the silicon photonic platform becomes a rib silicon photonic platform.

3. The silicon photonic platform of claim 1, wherein a first fluctuation value of a first vertical distance between the substrate top surface and the top surface of the first signal layer is less than 2 nanometers.

4. The silicon photonic platform of claim 1, wherein a thickness of the first signal layer is less than 10 nanometers.

5. The silicon photonic platform of claim 1, wherein a ratio of a thickness of the first signal layer to a thickness of the first photonic platform layer is 0.05 to 0.1.

6. The silicon photonic platform of claim 1, wherein a second fluctuation value of a second vertical distance between the substrate top surface and the top surface of the second photonic platform is less than 2 nanometers.

7. The silicon photonic platform of claim 1, wherein a ratio of a thickness of the second signal layer to a thickness of the second photonic platform layer is 0.05 to 0.1.

8. The silicon photonic platform of claim 1, wherein the second photonic platform layer comprises a plurality of the ridge structures, so that the silicon photonic platform becomes a grating silicon photonic platform.

9. The silicon photonic platform of claim 1, wherein the second photonic platform layer exposes a portion of the top surface of the second signal layer.

10. The silicon photonic platform of claim 1, wherein a third fluctuation value of a third vertical distance between the substrate top surface and the top surface of the second signal layer is less than 2 nanometers.

11. The silicon photonic platform of claim 1, wherein a thickness of the second signal layer is less than 10 nanometers.

12. The silicon photonic platform of claim 1, wherein the photonic platform material is selected from a group consisting of silicon and silicon nitride.

13. The silicon photonic platform of claim 1, wherein the photonic platform material is used for directionally guiding an electromagnetic wave, and a wavelength of the electromagnetic wave is greater than 760 nanometers.

14. A method for forming a composite platform, comprising:

providing a composite substrate having a substrate top surface and a first photonic platform layer, wherein the first photonic platform layer comprises a photonic platform material;

forming a first signal layer covering the first photonic platform layer, and comprising the photonic platform material and a first signal material, wherein a photonic platform spectral signal of the photonic platform material is different from a first spectral signal of the first signal material;

forming a third photonic platform layer covering the first signal layer and comprising the photonic platform material;

forming a second signal layer covering the third photonic platform layer, and comprising the photonic platform material and a second signal material, wherein the photonic platform spectral signal of the photonic platform material is different from a second spectral signal of the second signal material; and forming a second photonic platform layer covering the second signal layer and comprising the photonic platform material, and performing an etching process on the second photonic platform layer, so that the composite substrate, the first signal layer, the third photonic platform layer, the second signal layer, and the second photonic platform layer together form the composite platform, wherein the etching process is stopped when the second spectral signal is added to the photonic platform spectral signal and detected during the etching process.

15. A method for forming a silicon photonic platform, comprising:

providing a composite platform, wherein the composite platform is formed by the method of claim 14.

16. The method for forming a silicon photonic platform of claim 15, wherein the etching process is a grating etching process, by which the second photonic platform layer forms a plurality of ridge structures, wherein the plurality of ridge structures, the third photonic platform layer and the first photonic platform layer together form the grating silicon photonic platform.

17. The method for forming a silicon photonic platform of claim 15, wherein:

the etching process is a rib etching process on the second photonic platform layer and on the third photonic platform layer, by which the etched second photonic platform layer, the second signal layer and the etched third photonic platform layer together form a single ridge structure, wherein the single ridge structure forms a rib silicon photonic platform together with the first photonic platform layer.

18. The method for forming a silicon photonic platform of claim 17, wherein a first fluctuation value of a first vertical distance between the substrate top surface and a top surface of the first signal layer is less than 2 nanometers.

* * * * *